United States Patent
Egli et al.

(10) Patent No.: US 7,812,141 B2
(45) Date of Patent: *Oct. 12, 2010

(54) AZO COMPOUNDS

(75) Inventors: Robert Egli, Therwil (CH); Thomas Grabenstein, Lörrach (DE)

(73) Assignee: Clariant Finance (BVI) Limited, Tortola (VG)

( * ) Notice: Subject to any disclaimer, the term of this patent is extended or adjusted under 35 U.S.C. 154(b) by 591 days.

This patent is subject to a terminal disclaimer.

(21) Appl. No.: 11/792,776

(22) PCT Filed: Dec. 12, 2005

(86) PCT No.: PCT/EP2005/056682

§ 371 (c)(1),
(2), (4) Date: Jun. 8, 2007

(87) PCT Pub. No.: WO2006/061438

PCT Pub. Date: Jun. 15, 2006

(65) Prior Publication Data

US 2008/0161545 A1 Jul. 3, 2008

(30) Foreign Application Priority Data

Dec. 10, 2004 (EP) .................................. 04106484

(51) Int. Cl.
*C09B 29/02* (2006.01)
*C09B 29/085* (2006.01)
*C09D 11/02* (2006.01)

(52) U.S. Cl. ........................ 534/859; 534/573; 534/838; 8/528; 8/639; 8/662

(58) Field of Classification Search ................ 534/573, 534/838, 859; 8/528, 639, 662
See application file for complete search history.

(56) References Cited

U.S. PATENT DOCUMENTS

| 4,626,284 A | 12/1986 | Ohta et al. |
| 4,703,113 A | 10/1987 | Baxter et al. |
| 4,895,981 A | 1/1990 | Reinert et al. |
| 4,963,189 A | 10/1990 | Hindagolla |
| 5,061,404 A * | 10/1991 | Wu et al. .................... 252/582 |
| 5,186,865 A | 2/1993 | Wu et al. |
| 5,569,751 A | 10/1996 | Buhler |
| 5,910,624 A | 6/1999 | Wanken et al. |
| 7,101,983 B2 | 9/2006 | Egli et al. |
| 7,125,966 B2 * | 10/2006 | Egli ........................... 534/765 |
| 7,301,013 B2 * | 11/2007 | Egli et al. .................. 534/859 |

FOREIGN PATENT DOCUMENTS

| EP | 0 425 150 | 5/1991 |
| FR | 1.445.371 | 2/1968 |
| GB | 1 019 782 | 2/1966 |
| GB | 2 058 115 | 4/1981 |
| WO | WO 91/09842 | 7/1991 |

OTHER PUBLICATIONS

Wu et al (1992): STN International HCAPLUS database, Columbus (OH), accession No. 1992:48602.*
PCT Written Opinion of the International Searching Authority for application No. PCT/EP 2005/056682 mail dated May 4, 2006.
PCT Search Report for application No. PCT/EP 2005/056682 mail dated May 4, 2006.
Advanced Organic Chemistry, Fieser & Fieser, 1961, pp. 736-740.
Draganov, AI., "Preparation of N-(Cyanomethyl)-N-(Beta-hydroxyethyl)aniline and Its Use as a Coupling Component in the Synthesis of Disperse Dyes", Chemical Abstracts + Indexes, American Chemical Society, Columbus, US, vol. 79, No. 16, 1973, p. 63.
Organische Chemie, K.Peter C.Vollhardt, pp. 1154-1157, 1.Auflage 1988.
Nakagawa, Ryoichi, et al: "Disperse Azo Dyes", Chemical Abstracts + Indexes, American Chemical Society, Columbus, US, vol. 80, No. 14, 1974, p. 75.
Rys, P., et al: "Leitfaden der Farbstoffchemie", Farbstoffchemie. Ein Leitfaden, Verlag Chemie, Weinhem, DE, 1976, pp. I, 64-65.
Sokolova, N.B., et al: "Photodegradation of Azo Dyes With Heterocyclic and Benzene Groups in Polymeric Matrix", Russian Journal of Applied Chemistry, Pleiades Publishing/Springer, New York, NY, US, vol. 75, No. 2, 2002, pp. 254-256.

* cited by examiner

*Primary Examiner*—Golam M Shameem
(74) *Attorney, Agent, or Firm*—Anthony A. Bisulca

(57) ABSTRACT

The present invention relates to novel dyestuffs of formula (I)

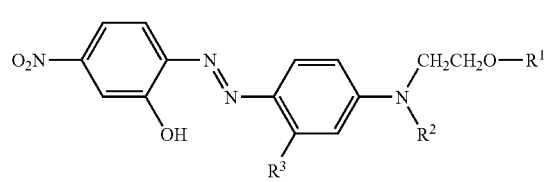

wherein the substituents have the meanings defined in the claims, the production of such dyestuffs, the use of these dyestuffs and material dyed or printed by such dyestuffs.

7 Claims, No Drawings

AZO COMPOUNDS

The present invention relates to novel disperse dyes, to their preparation, and to the use thereof for dyeing and printing regenerated or synthetic hydrophobic materials and/or blends comprising regenerated or synthetic hydrophobic materials.

The present invention relates to novel dyestuffs of formula (I)

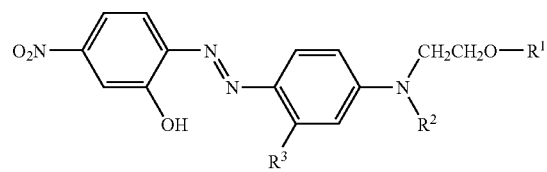

(I)

wherein $R^1$ signifies $C_{1-2}$-alkyl; allyl; propargyl; benzyl or phenyl,
$R^2$ signifies H; —$CH_2CH_2O$—$R^1$; $CH_2CH_2CN$; $C_{1-4}$-alkyl; substituted $C_{2-4}$-alkyl which is substituted by one or more substituents of the group consisting of halogen, —OH, —$OC_{1-2}$-alkyl or —$OCOC_{1-2}$-alkyl; $C_{3-4}$-alkenyl; substituted $C_{3-4}$-alkenyl, preferably substituted by —Cl or —Br; propargyl; $C_{2-4}$-alkylene-OCO—$C_{1-2}$-alkyl; $C_{2-4}$-alkylene-O(CO)O—$C_{1-2}$-alkyl; $C_{1-2}$alkylene-COO—$R^5$; $C_{1-2}$-alkylene-COOCH$_2$COOR$^5$ or $C_{1-2}$-alkylene-COOCH$_2$COR$^6$, preferably $CH_2CH_2CN$,
wherein $R^5$ signifies $C_{1-4}$-alkyl; benzyl; $C_{1-2}$-alkoxyethyl; $C_{3-4}$-alkenyl; propargyl; tetrahydrofurfuryl-2; phenyl or phenyl, which is substituted by —$CH_3$, —$OCH_3$, —$COOCH_3$ or —$COOC_2H_5$,
$R^6$ signifies $CH_3$ or phenyl,
$R^3$ signifies H or $CH_3$, as well as mixtures thereof.

Any alkyl present is linear or branched unless indicated to the contrary. Substituted alkyl groups are substituted by halogen, —OH, —$OC_{1-2}$-alkyl or —$OCOC_{1-2}$-alkyl; $C_{3-4}$-alkenyl; substituted $C_{3-4}$-alkenyl, preferably substituted by —Cl or —Br; propargyl; $C_{2-4}$-alkylene-OCO—$C_{1-2}$-alkyl; $C_{2-4}$-alkylene-O(CO)O—$C_{1-2}$-alkyl;

$C_{1-2}$alkylene-COO—$R^5$; $C_{1-2}$-alkylene-COOCH$_2$COOR$^5$ or $C_{1-2}$-alkylene-COOCH$_2$COR$^6$.

Any substituted alkyl present can be substituted by one or more identical or different substituent. Halogen atoms are preferably chlorine or bromine.

In formula I, preferably
$R^1$ signifies $C_{1-2}$-alkyl; allyl; propargyl;
$R^2$ signifies H; —$CH_2CH_2O$—$R^1$; $CH_2CH_2CN$; $C_{1-4}$-alkyl; allyl; propargyl; $C_{2-4}$-alkylene-OCO—$C_{1-2}$-alkyl; $C_{1-2}$alkylene-COO—$R^5$; or $C_{1-2}$-alkylene-COOCH$_2$COOR$^5$ preferably $CH_2CH_2CN$,
wherein $R^5$ signifies $C_{1-4}$-alkyl; allyl; benzyl or propargyl,
$R^3$ signifies H or $CH_3$, as well as mixtures thereof.

Particularly preferred are dyestuffs of formula (I) and mixtures thereof, wherein
$R^1$ signifies $C_{1-2}$-alkyl;
$R^2$ signifies —$CH_2CH_2O$—$CH_3$; —$CH_2CH_2CN$; allyl; propargyl; $C_2H_4OCOC_{1-2}$-alkyl; $C_2H_4COO$—$R^5$ or $C_{1-2}$-alkylene-COOCH$_2$COO—$R^5$, preferably $CH_2CH_2CN$,
wherein $R^5$ signifies $C_{1-2}$-alkyl; allyl or benzyl,
$R^3$ signifies H or $CH_3$.

Most preferred are dyestuffs of formula (I) and mixtures thereof, wherein
$R^1$ signifies $CH_3$,
$R^2$ signifies —$CH_2CH_2O$—$CH_3$; —$CH_2CH_2CN$; $C_2H_4O$—CO—$C_{1-2}$-alkyl; $C_2H_4COO$—$C_{1-2}$-alkyl or $C_2H_4COOCH_2COO$—$R^5$ preferably $CH_2CH_2CN$,
wherein $R^5$ signifies $C_{1-2}$-alkyl or benzyl,
$R^3$ signifies H.

In the most preferred dyestuffs the substituent $R^1$ signifies $CH_3$.

In the most preferred dyestuffs the substituent $R^3$ signifies H.

In the most preferred dyestuffs the substituent $R^2$ signifies $CH_2CH_2CN$,

In the further most preferred dyestuffs the substituent $R^3$ signifies $CH_3$.

The above-mentioned novel compounds according to the formula (I) as well as mixtures thereof are very useful disperse dyestuffs.

Production of these dyestuffs is effected by coupling a diazotized amine of formula (II)

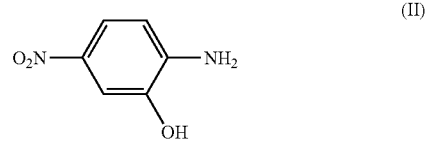

(II)

with an amine of formula (III)

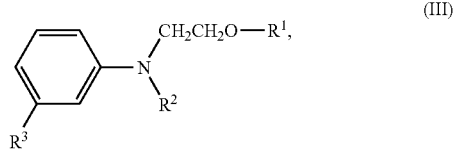

(III)

wherein all substituents have the same meanings as defined above.

Diazotization and coupling are effected by generally known processes.

The diazotization is carried out, for example using sodium nitrite in acid aqueous medium. The diazotization can also be carried out using other diazotization agents, for example nitrosulfuric acid. An additional acid may be present in the reaction medium during diazotization, for example phosphoric acid, sulfuric acid, acetic acid, propionic acid, hydrochloric acid or mixtures of these acids, e.g. mixtures of phosphoric acid, and acetic acid. Diazotization is conveniently carried out within the temperature range of from −10 to 10° C., preferably from 0° C. to 5° C.

Coupling of the diazotized compound of formula (II) to the coupling component of formula (III) is carried out in known manner, for example in acid, aqueous or aqueous-organic medium, preferably within the temperature range from 0° C. to 50° C., more preferably from 20° C. to 40° C. Acid used are, for example hydrochloric acid, acetic acid, sulfuric acid or phosphoric acid. For example diazotization and coupling can be carried out in the same reaction medium.

Alkali metal nitrites, such as, for example, sodium nitrite, in solid form or as an aqueous solution, or in nitrosylsulfuric acid are employed as the nitrosating agents.

The preparation of the diazonium ion, typically through the reaction with excess nitrous acid or the like such as nitrosyl sulfuric acid at low temperature to form the electrophilic ion Aryl-$N_2^+$ is disclosed in the literature e.g. Advanced Organic Chemistry, Fieser & Fieser, pages 736-740 or Organische Chemie, K. Peter C. Vollhardt, pages 1154-1157, 1.Auflage 1988.

The compounds of formulae (II) and (III) are known or may easily be produced in a manner familiar to the person skilled in the art.

The new dyestuffs of formula (I) as well as mixtures thereof can be used for dyeing and printing semisynthetic and, preferably, synthetic hydrophobic fiber materials, especially textile materials. Textile materials consisting of blended fabrics containing such semisynthetic hydrophobic fiber materials can also be dyed or printed by means of the dyes of this invention.

Suitable semisynthetic textile materials are mainly cellulose-2½ acetate, cellulose triacetate, polyamides and high molecular weight polyesters and polyurethanes as well as mixtures thereof with cellulose.

Synthetic hydrophobic textile materials consist mainly of linear aromatic polyester, for example of those consisting of terephthalic acid and glycols, in particular ethylene glycol or condensate of terephthalic acid and 1,4-bis(hydroxymethyl) cyclohexane; of polycarbonates, e.g. those consisting of α,α-dimethyl-4,4'-dihydroxydiphenylmethane and phosgene, and of fibers based on polyvinyl chloride, polyamide and polyurethanes. Preferred hydrophobic textile materials which are used as substrates are mixtures of polyurethanes fibres and polyesterfibers.

The hydrophobic synthetic materials can be in the form of sheet-like or thread-like structures, and can be processed, for example, to yarns or woven, knitted or looped textile fabrics. The novel dyes are also suitable for dyeing hydrophobic synthetic material in the form of micro fibers.

It is expedient to convert the novel dyes according to formula (I) before use into a dye formulation. This is done by milling the dye to an average particle size of 0.1 to 10 micron. Milling can be carried out in the presence of dispersants. Typically, the wet dye is milled with a dispersant, and thereafter dried under vacuum or by spray drying. Printing pastes and dyebaths can be prepared by adding water to the formulation so obtained.

The new dyestuffs according to formula (I) are applied to the textile materials by known dyeing or printing methods, e.g. those described in French patent application No. 1.445.371.

Typically, polyester fiber materials are dyed from an aqueous dispersion by the exhaust process in the presence of customary anionic or non-ionic dispersants and in the presence or absence of customary swelling agents (carrier) in the temperature range from 65° C. to 140° C.

Cellulose-2½-acetate is preferably dyed at a temperature from 65° C. to 85° C. and cellulose triacetate at temperatures up to 115° C.

The novel dyes are suitable for dyeing by the thermosol process, for the exhaust process, the continuous process and for printing as for modern imaging processes, e.g. thermotransfer printing, ink-jet printing, hot melt inkjet printing or by conventional printing processes.

The thermosol process, the exhaust process and the continuous process are well known dyeing processes and are described for example in M. Peter and H. K. Rouette: "Grundlagen der Textilveredelung; Handbuch der Technologie, Verfahren und Maschinen", 13$^{th}$ revised Edition, 1989, Deutscher Fachverlag GmbH, Frankfurt am Main, Germany, ISBN 3-87150-277-4; wherein the following pages are of special interest: pages 460-461, 482-495, 556-566 and 574-587.

In the inkjet printing process, individual droplets of the ink are sprayed from a nozzle onto a substrate in a controlled manner. The continuous inkjet method and the drop-on-demand method are employed predominantly for this purpose. In the case of the continuous inkjet method, the droplets are produced continuously and droplets not needed for printing are diverted into a collecting vessel and recycled. In the case of the discontinuous drop-on-demand method, by contrast, droplets are generated and printed as desired, i.e. droplets are only generated when this is necessary for printing. The droplets may be generated for example by means of a piezo inkjet head or by means of thermal energy (bubble jet).

In hot melt inkjet printer solid hot melt inks are loaded in a printer capable of melting the ink in the inkjet printer head, ejecting the liquid ink which quickly resolidifies upon impacting a substrate. Conventional hot melt inkjet printers operate with a printing head and inkjet temperature of about 120 to about 150° C. At those temperatures, the solid ink is melted to a low viscosity liquid, generally about 8 to 25 cP when measured at jetting temperature.

Conventional printing processes are well known and differ in the way the printing ink or printing paste is transferred to the substrate: For example, inks or pastes can be applied by raised type (e.g. letter press, flexographic), from a planar surface (lithographic), from a recessed surface (intaglio) or through a stencil (silk screen). Different methods of application and different substrates require different properties in the ink.

The dyeings are carried out from an aqueous liquor by the exhaust process, and the liquor ration can be chosen from a wide range, for example from 1:4 to 1:100, preferably from 1:6 to 1:50.

The dyeing time is from 20 to 90 minutes, preferably from 30 to 60 minutes. The dye liquors can additionally comprise other additives, for example dyeing auxiliaries, dispersants, wetting agents and antifoams.

The liquor may also comprise mineral acids, such as sulfuric acid or phosphoric acid, or conveniently also organic acids, for example formic acid or acetic acid and/or salts, such as ammonium acetate, ammonium sulfate or sodium sulfate. The acids mainly serve to adjust the pH of the dye liquors which is preferably in the range from 4 to 5.

The disperse dyes are usually present in the dye liquors in the form of a fine dispersion. Suitable dispersants for the preparation of this dispersion are e.g. anionic dispersants, such as aromatic sulfonic acid/formaldehyde condensates, sulfonated creosol oil/formaldehyde condensates, lignin sulfonates or copolymers of acrylic acid derivates, preferably aromatic sulfonic acid/formaldehyde condensates or lignin sulfonated, or nonionic dispersants based on polyalkylene oxides obtainable, for examples, by polyaddition reaction from ethylene oxide or propylene oxide. Further suitable dispersants are listed in U.S. Pat. No. 4,895,981 or in U.S. Pat. No. 5,910,624.

Suitable inks or pastes comprise a) at least one dye of the formula (I) or mixtures of compounds of the formula (I), b) water or a medium including a mixture of water and an organic solvent, an anhydrous organic solvent or a solid having a low melting point, and c) optionally further additives.

The inks or pastes preferably include a total amount of dyes of the above formula (I). which is in the range from 1 to 35% by weight, especially in the range from 2 to 35% by weight, preferably in the range from 2 to 30% by weight, more preferably in the range from 2.5 to 20% by weight, based on the total weight of the ink or paste.

The inks include 99-65% by weight, especially 98-65% by weight, preferably 98-70% by weight, more preferably 97.5-80% by weight, of an abovementioned medium b), which includes water or a mixture of water and an organic solvent, an anhydrous organic solvent or a solid having a low melting point.

When said medium b) is a mixture including water and an organic solvent or an anhydrous organic solvent, then the dye of formulae (I) or mixtures thereof are preferably completely dissolved in this medium.

Preferably the dye of formulae (I) or mixtures thereof have a solubility of not less than 2.5% by weight in this medium b) at 20° C.

When the ink composition of the invention is used for printing papery substrates or hydrophobic substrates made of acetate-, polyester-, polyamide-, polyacrylnitrile-, polyvinylchloride- or polyurethane-polymers and blends thereof, the inks are preferably used together with the following compositions.

When the medium is a mixture of water and an organic solvent, the weight ratio of water to organic solvent is preferably in the range from 99:1 to 1:99, more preferably in the range from 99:1 to 50:50, particularly preferably in the range from 95:5 to 80:20.

It is preferable for the organic solvent which is included in the mixture with water to be a water-soluble solvent or a mixture of various water-soluble solvents. Preferred water-soluble organic solvents are $C_{1-6}$-alcohols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and keto alcohols, preferably acetone, methyl ethyl ketone, cyclohexanone and 4-hydroxy-4-methyl-2-pentanone; water-miscible ethers, preferably tetrahydrofuran and dioxane; diols, preferably diols possessing 2 to 12 carbon atoms, e.g. 1,5-pentanediol, ethylene glycol, propylene glycol, butylene glycol, pentylene glycol, hexylene glycol, thiodiglycol and oligo- and poly-alkylene glycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols possessing 2 to 12 carbon atoms, particularly preferably 2-methoxyethanol, 2-(2-methoxyethoxy)ethanol, 2-(2-ethoxyethoxy)ethanol, 2-[2-(2-methoxyethoxy)ethoxy]ethanol, 2-[2-(2-ethoxyethoxy)ethoxy]ethanol and ethylene glycol monoallyl ether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane.

In a preferred composition, the medium as per b) includes water and at least 2 or more, more preferably 2 to 8, water-soluble organic solvents.

Particularly preferred water-soluble solvents are cyclic amides, particularly 2-pyrrolidone, N-methylpyrrolidone and N-ethylpyrrolidone; diols, preferably 1,5-pentanediol, ethylene glycol, thiodiglycol, diethylene glycol and triethylene glycol; and mono-$C_{1-4}$-alkyl and di-$C_{1-4}$-alkyl ethers of diols, more preferably mono-$C_{1-4}$-alkyl ethers of diols possessing 2 to 12 carbon atoms, particularly preferably 2-[2-(2-methoxyethoxy)ethoxy]ethanol.

A preferred medium as per b) includes:
(i) 75 to 95 parts by weight of water and
(ii) 25 to 5 parts of one or more of the following solvents: diethylene glycol, 2-pyrrolidone, thiodiglycol, N-methylpyrrolidone, cyclohexanol, caprolactone, caprolactam and 1,5-pentanediol, wherein the parts are by weight and all parts of (i) and (ii) add up to 100.

Examples of further useful ink compositions including water and one or more organic solvents are found in the patent Specifications U.S. Pat. No. 4,963,189, U.S. Pat. No. 4,703,113, U.S. Pat. No. 4,626,284 and EP 425150A.

When the medium as per b) includes an anhydrous (i.e. less than 1% by weight of water) organic solvent, this solvent will have a boiling point of 30 to 200° C., more preferably of 40-150° C., particularly preferably of 50-125° C.

The organic solvent can be water-insoluble, water-soluble or mixtures of such solvents. Preferred water-soluble organic solvents are all above-described water-soluble organic solvents and mixtures thereof.

Preferred water-insoluble solvents include inter alia aliphatic hydrocarbons; esters, preferably ethyl acetate; chlorinated hydrocarbons, preferably $CH_2Cl_2$; and ethers, preferably diethyl ether; and mixtures thereof.

When the liquid medium as per b) includes a water-insoluble organic solvent, it is preferable to add a polar solvent to increase the solubility of the dye in the liquid medium.

Examples of such polar solvents are $C_{1-4}$-alcohols, preferably ethanol or propanol; ketones, preferably methyl ethyl ketone.

The anhydrous organic solvent can consist of a single solvent or a mixture of 2 or more different solvents.

When it is a mixture of different solvents, a mixture including 2 to 5 different anhydrous solvents is preferred. This makes it possible to provide a medium as per b) which permits good control of the drying properties and of the stability of the ink composition in storage.

Ink compositions including an anhydrous organic solvent or mixtures thereof are of particular interest when rapid drying times are required and especially when they are used for prints on hydrophobic and non-absorbing substrates, such as plastic, metal and glass.

Preferred low-melting media have a melting point of 60 to 140° C. Useful low-melting solids include long-chain fatty acids or alcohols, preferably those having a $C_{18-24}$-carbon chain, and sulphonamides. Conventional low-melting ink vehicles generally include various proportions of waxes, resins, plasticizers, tackifiers, viscosity modifiers and antioxidants.

The ink composition and the printing pastes of the invention may further include as auxiliaries additional components which are normally used in inkjet inks or printing pastes, for example buffers, viscosity improvers, surface tension improvers, fixation accelerators, biozides, corrosion inhibitors, levelling agents, drying agents, humefactants, ink penetration additives, light stabilisers, UV absorbers, optical brighteners, coagulation reducers, ionic or nonionic surfactants and conducting salts. These auxiliaries are preferably added in an amount of 0-5% by weight to inks. To printing pastes up to 70% by weight, especially up to 60% by weight, preferably up to 55% by weight, based on the total weight of the printing paste.

To prevent precipitations in the ink compositions of the invention, the dyes used have to be purified clean. This can be done with commonly known purifying methods.

When the compositions of the invention are used for printing textile fibre materials, preference is given to using the following compositions.

When printing textile fibre materials, useful additives, besides the solvents including water, are synthetic thickener, natural thickener or modified natural thickeners which may include water-soluble nonionic cellulose ethers, alginates or bean gum ether. All, the water-soluble nonionic cellulose ethers, the alginates and the bean gum ether, are used as thickeners to adjust the ink to a certain viscosity.

Useful water-soluble nonionic cellulose ethers include for example methyl-, ethyl-, hydroxyethyl-, methylhydroxyethyl-, hydroxypropyl- or hydroxypropylmethyl-cellulose. Preference is given to methylcellulose or in particular hydroxyethylcellulose. Cellulose ethers are customarily used in the ink in an amount of 0.01 to 2% by weight, especially 0.01 to 1% by weight, preferably 0.01 to 0.5% by weight, based on the total weight of the ink.

Useful alginates include in particular alkali metal alginates, preferably sodium alginate. These are customarily used in the ink in an amount of 0.01 to 2% by weight, especially 0.01 to 1% by weight, preferably 0.01 to 0.5% by weight, based on the total weight of the ink.

Printing pastes include up to 70% by weight thickening agents, preferably up to 55% by weight thickening agents. In printing pastes the thickening agents are used in an amount of 3 to 70% by weight, especially 5 to 60% by weight, preferably 7 to 55% by weight, based on the total weight of the printing paste.

In the ink jet printing process preference is given to ink compositions having a viscosity of 1 to 40 mPa·s, especially 5 to 40 mPa·s, preferably 10 to 40 mPa·s. Ink compositions having a viscosity of 10 to 35 mPa·s are particularly preferred.

Preference is given to ink compositions having a surface tension of 15-73 mN/m, especially 20-65 mN/m, particularly preferably 30-50 mN/m.

Preference is given to ink compositions having a conductivity of 0.1-100 mS/cm, especially 0.5-70 mS/cm, particularly preferably 1.0-60 mS/cm.

The inks may further include buffer substances, for example acetate, phosphate, borax, borate or citrate. Examples are sodium acetate, di-sodium hydrogen phosphate, sodium borate, sodium tetraborate and sodium citrate.

The dyeings or printings thus obtained, have good allround fastness; particularly noticeable are the thermomigration fastness, thermofixation- and pleating fastness, in particular the excellent wet fastness.

In the following examples, the parts and percentages are by weight. The temperatures are given in degrees Celsius.

EXAMPLE 1

Diazotization 15.4 parts of 2-amino-5-nitrophenol are dissolved in 13.7 parts of cold 30% sodium hydroxide solution. 36.5 parts of 30% HCl are added and afterwards during a period of 1 hour 6.9 parts of sodium nitrite as an aqueous solution (40%) are added at a temperature of 0-5° C. The solution is stirred for 2 hours at 0-5° C. and 0.1 parts of aminosulfonic acid are added to destroy the excess of sodium nitrite.

Coupling:

A solution of 20.8 parts of N-Cyanethyl-N-methoxyethylaminobenzene in 100 parts glacial acetic acid is added continuously to the diazonium salt solution. The solution is stirred for 24 hours at 30° C. The precipitated dyestuff is filtered off, washed with water and dried in the vacuum at 60° C.

The isolated dyestuff of formula (IV)

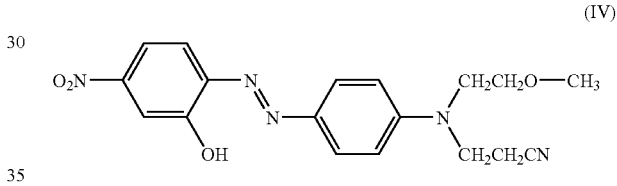

(IV)

has a $\lambda_{max}$ of 505 nm (in DMF) and dyes polyester in red shades with good allround fastness, especially wet fastness.

TABLE 1

Examples 2-15

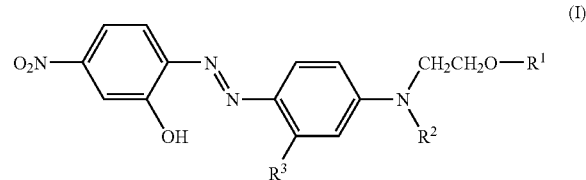

(I)

| Ex. No. | $R^3$ | $R^2$ | $R^1$ | $\lambda_{max}$ DMF [nm] |
|---|---|---|---|---|
| 2 | H | —CH₂CH₂CN | —CH₂CH₃ | 506 |
| 3 | H | —CH₂CH₂CN | —CH₂CH═CH | 504 |
| 4 | H | —CH₂CH₂CN | —CH₂CH═CH₂ | 504 |
| 5 | H | —CH₂CH₂CN | —CH₂C₆H₅ | 501 |
| 6 | H | —CH₂CH₂CN | —C₆H₅ | 498 |
| 7 | H | —CH₂C₆H₅ | —CH₃ | 523 |
| 8 | H | —CH₂CH═CH₂ | —CH₃ | 515 |
| 9 | H | —CH₂CH═CH—Cl | —CH₃ | 511 |
| 10 | H | —CH₂CH═CH | —CH₃ | 508 |
| 11 | H | —CH₂CH(OH)CH₂—Cl | —CH₃ | 510 |
| 12 | H | —CH₂CH(OCOCH₃)CH₂OCOCH₃ | —CH₃ | 502 |
| 13 | H | —CH₂CH₂COOCH₃ | —CH₃ | 508 |
| 14 | H | —CH₂CH₂COOC₂H₅ | —CH₃ | 510 |
| 15 | H | —CH₂CH₂COOCH₂C₆H₅ | —CH₃ | 509 |

TABLE 2

Examples 16-30

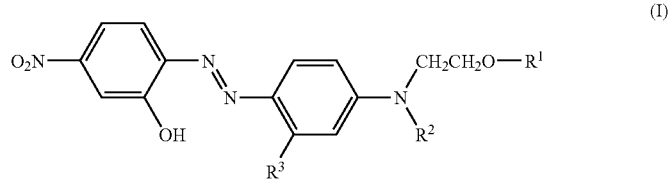

(I)

| Ex. No. | R³ | R² | R¹ | $\lambda_{max}$ DMF [nm] |
|---|---|---|---|---|
| 16 | H | —CH$_2$CH$_2$COOCH$_2$CH=CH$_2$ | —CH$_3$ | 508 |
| 17 | H | —CH$_2$CH$_2$COOC$_2$H$_4$OCH$_3$ | —CH$_3$ | 510 |
| 18 | H | —CH$_2$CH$_2$COOC$_2$H$_4$OC$_2$H$_4$OCH$_3$ | —CH$_3$ | 510 |
| 19 | H | —CH$_2$CH$_2$COOCH$_2$COOCH$_3$ | —CH$_3$ | 509 |
| 20 | H | —CH$_2$CH$_2$COOCH$_2$COOC$_2$H$_5$ | —CH$_3$ | 511 |
| 21 | H | —CH$_2$CH$_2$COOCH$_2$COOCH$_2$C$_6$H$_5$ | —CH$_3$ | 510 |
| 22 | H | —CH$_2$CH$_2$COOCH$_2$COO-2-terahydrofurfuryl | —CH$_3$ | 512 |
| 23 | H | —CH$_2$CH$_2$COOCH$_2$COOC$_6$H$_4$-4-COOCH$_3$ | —CH$_3$ | 508 |
| 24 | H | —CH$_2$CH$_2$OCOCH$_3$ | —CH$_3$ | 507 |
| 25 | H | —CH$_2$CH$_2$OCOOCH$_3$ | —CH$_3$ | 505 |
| 26 | H | —CH$_2$CH$_2$OCOC$_2$H$_5$ | —CH$_3$ | 509 |
| 27 | —CH$_3$ | —CH$_2$CH$_2$CN | —CH$_3$ | 519 |
| 28 | —CH$_3$ | —CH$_2$CH$_2$CN | —CH$_2$CH$_3$ | 524 |
| 29 | —CH$_3$ | —CH$_2$CH$_2$CN | —CH$_2$CH=CH | 522 |
| 30 | —CH$_3$ | —CH$_2$CH$_2$CN | —CH$_2$CH=CH$_2$ | 522 |

APPLICATION EXAMPLE A 17.5 parts of the dyestuff according to example 1 in the form of the moist presscake are wet-ground by a known method with 32.5 parts of a commercial dispersing agent based on lignin sulfonates, and pulverized to a powder. 1.2 parts of this dye preparation are added to 2000 parts of demineralized water of 70° C., which contains 40 parts of ammonium sulfate; the pH value of the dye bath is set at 5 with 85% formic acid. 100 parts of washed polyester fiber fabric are placed in this dye bath, the container is closed, heated to 130° C. over the course of 20 minutes, and dyeing continues for a further 60 minutes at this temperature. After cooling, the polyester fiber fabric is removed from the dye bath, rinsed, soaped and cleaned by reduction with sodium hydrosulfite in the usual way. After thermo-fixation (180° C., 30 sec), a brilliant red dyeing is obtained with very good all-round fastness, especially fastness to light and sublimation, in particular excellent wet fastness. The dyestuffs of examples 2 to 30 may be used in analogous manner, and dyeings with very good all-round fastness are obtained.

Dyeing polyester yarn can be carried out analogously with examples 2-30.

APPLICATION EXAMPLE B 2.5 parts of the dyestuff obtained in Example 1 are dissolved with stirring at 25° C. in a mixture of 20 parts diethyleneglycol and 77.5 parts water to obtain a printing ink suitable for ink jet printing.

The dyestuffs of Examples 2 to 30 or dyestuff mixtures of Examples 1 to 30 can also be used in a manner analogous to that described in Application Example B.

APPLICATION EXAMPLE C

A printing paste according to the invention consists of 500 g of a thickener (bean gum ether e.g. Indalca™), 10 g of a fixation accelerant (e.g. Printogen HDN™), 10 g of a levelling agent (e.g. Sandogen CN™), 10 g of a buffer and dispersant system for dyeing (eg. Sandacid PB™; 1:2) and 10 g of a dye of example 1 and adding water up to 1000 g.

(Indalca was purchased from Cesalpinia S.p.A, Italy; Sandogen, Printogen and Sandacid are a trademarks of Clariant A G, Muttenz/Switzerland.)

This printing paste is used for printing papery substrates, textile fibre materials and plastic films and plastic transparencies.

The dyestuffs of Examples 2 to 30 or dyestuff mixtures of Examples 1 to 30 can also be used in a manner analogous to that described in Application Example C.

APPLICATION EXAMPLE D

A polyester Interlock fabric was printed with a conventional printing machine using the printing paste of the APPLICATION EXAMPLE C. The resulting printed fabric is dried for 3 minutes at 110° C. and then treated with hot steam for 7 minutes at 175° C. The fabric was rinsed with cold tap water for 5 minutes, and then rinsed for 5 minutes with demineralised water. The so treated fabric was reductively cleansed in a bath comprising 4 g/l Na$_2$CO$_3$, 2 g/l hydrosulfite sodium salt (85%) and 1 g/l Lyogen DFT™ (Trademark of Clariant AG, Muttenz, Switzerland). Further rinsing for 15 minutes with tap water was followed by a final drying step. This leaves a polyester fabric with a brilliant red print with very good all-round fastness, especially fastness to light and sublimation, in particular excellent wet fastness.

The dyestuffs of Examples 2 to 30 or dyestuff mixtures of Examples 1 to 30 can also be used in a manner analogous to that described in Application Example D.

APPLICATION EXAMPLE E

The ink jet printing composition is preferably prepared by heating the medium to 40° C. and then adding a dye of the example 1. The mixture is stirred until the dyes are dissolved. The composition is then cooled down to room temperature and the further ingredients are added.

The fractions of the individual components of the ink compositions 6 parts of the dye of example 1, 20 parts of glycerol and 74 parts of water.

This ink composition is used for printing papery substrates, textile fibre materials and plastic films and plastic transparencies.

The dyestuffs of Examples 2 to 30 or dyestuff mixtures of Examples 1 to 30 can also be used in a manner analogous to that described in Application Example E.

APPLICATION EXAMPLE F

A polyester Interlock fabric was ink jet printed using the printing ink of the APPLICATION EXAMPLE E. The printed fabric was treated analogously to the post printing treatment of APPLICATION EXAMPLE D. This leaves a polyester fabric with a brilliant red print with very good all-round fastness, especially fastness to light and sublimation, in particular excellent wet fastness.

The dyestuffs of Examples 2 to 30 or dyestuff mixtures of Examples 1 to 30 can also be used in a manner analogous to that described in Application Example F.

The invention claimed is:

1. A dyestuff of formula (I)

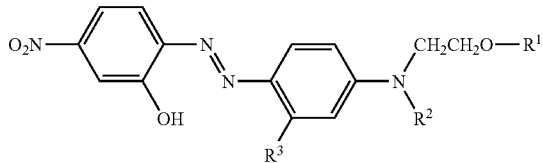

(I)

wherein $R^1$ is $C_{1-2}$-alkyl; allyl; propargyl; benzyl or phenyl, $R^2$ is H; —$CH_2CH_2O$—$R^1$; $CH_2CH_2CN$; $C_{1-4}$-alkyl; $C_{2-4}$-alkyl substituted by one or more substituents selected from the group consisting of: halogen, —OH, —$OC_{1-2}$-alkyl or —$OCOC_{1-2}$-alkyl; $C_{3-4}$-alkenyl; substituted $C_{3-4}$-alkenyl, propargyl; $C_{2-4}$-alkylene-OCO—$C_{1-2}$-alkyl;

$C_{2-4}$-alkylene-O(CO)O—$C_{1-2}$-alkyl; $C_{1-2}$alkylene-COO—$R^5$;

$C_{1-2}$-alkylene-COOCH$_2$COOR$^5$ and $C_{1-2}$-alkylene-COOCH$_2$COR$^6$, wherein $R^5$ is $C_{1-4}$-alkyl; benzyl; $C_{1-2}$-alkoxyethyl; $C_{3-4}$-alkenyl; propargyl; tetrahydrofurfuryl-2; phenyl or phenyl substituted by —$CH_3$, —$OCH_3$, —$COOCH_3$ or —$COOC_2H_5$, $R^6$ is $CH_3$ or phenyl, $R^3$ is H or $CH_3$.

2. A dyestuff according to claim 1, wherein $R^1$ is $C_{1-2}$-alkyl; allyl; or propargyl;

$R^2$ is H; —$CH_2CH_2O$—$R^1$; $CH_2CH_2CN$; $C_{1-4}$-alkyl; allyl; propargyl; $C_{2-4}$-alkylene-OCO—$C_{1-2}$-alkyl; $C_{1-2}$-alkylene-COO—$R^5$; or $C_{1-2}$-alkylene-COOCH$_2$COOR$^5$, wherein $R^5$ is $C_{1-4}$-alkyl; allyl; benzyl or propargyl, $R^3$ is H or $CH_3$.

3. A dyestuff according to claim 1, wherein $R^1$ is $C_{1-2}$-alkyl;

$R^2$ is —$CH_2CH_2O$—$CH_3$; —$CH_2CH_2CN$; allyl; propargyl; $C_2H_4OCOC_{1-2}$-alkyl; $C_2H_4COO$—$R^5$ or $C_{1-2}$-alkylene-COOCH$_2$COO—$R^5$, wherein $R^5$ is $C_{1-2}$-alkyl; allyl or benzyl, $R^3$ is H or $CH_3$.

4. A dyestuff according to claim 1, wherein $R^1$ is $CH_3$, $R^2$ is —$CH_2CH_2O$—$CH_3$; —$CH_2CH_2CN$; $C_2H_4O$—CO—$C_{1-2}$-alkyl;

$C_2H_4COO$—$C_{1-2}$-alkyl or $C_2H_4COOCH_2COO$—$R^5$, wherein $R^5$ is $C_{1-2}$-alkyl or benzyl, $R^3$ is H and mixtures thereof.

5. A composition comprising at least one dyestuff of formula (I) according to claim 1.

6. A dyestuff according to claim 1, wherein $R^2$ is $C_{3-4}$-alkenyl, substituted by —Cl or —Br.

7. A dyestuff according to claim 1, wherein $R^2$ is $CH_2CH_2CN$.

* * * * *